(12) United States Patent
Aldridge et al.

(10) Patent No.: US 11,132,445 B2
(45) Date of Patent: Sep. 28, 2021

(54) COMBINED ANALYTICAL TOOLS FOR ELECTRONIC WARFARE AND CYBERSECURITY TESTING IN EMBEDDED SYSTEMS

(71) Applicants: Hal A Aldridge, Raleigh, NC (US); John T. Orr, Raleigh, NC (US)

(72) Inventors: Hal A Aldridge, Raleigh, NC (US); John T. Orr, Raleigh, NC (US)

(*) Notice: Subject to any disclaimer, the term of this patent is extended or adjusted under 35 U.S.C. 154(b) by 296 days.

(21) Appl. No.: 15/996,575

(22) Filed: Jun. 4, 2018

(65) Prior Publication Data
US 2020/0026860 A1 Jan. 23, 2020

(51) Int. Cl.
*G06F 21/57* (2013.01)
*G06F 11/36* (2006.01)
*G06F 8/61* (2018.01)

(52) U.S. Cl.
CPC ........ *G06F 21/577* (2013.01); *G06F 11/3664* (2013.01); *G06F 11/3684* (2013.01); *G06F 11/3688* (2013.01); *G06F 11/3692* (2013.01); *G06F 8/61* (2013.01); *G06F 2221/033* (2013.01)

(58) Field of Classification Search
CPC ............... G06F 21/577; G06F 11/3688; G06F 11/3692; G06F 11/3684; G06F 11/3664; G06F 2221/033; G06F 8/61; G06F 21/57; G06F 11/36
See application file for complete search history.

(56) References Cited

U.S. PATENT DOCUMENTS

2003/0083831 A1* 5/2003 Agrawal .................... G06F 7/50
702/65
2018/0219887 A1* 8/2018 Luo ......................... H04L 63/14

* cited by examiner

*Primary Examiner* — Quazi Farooqui
(74) *Attorney, Agent, or Firm* — John L. Sotomayor (57) ABSTRACT

A system and method for testing for software vulnerabilities within components installed within a compartmentalized testing environment is presented herein. The system allows software code to be run within a software simulation environment, providing representative signals, whether Radio Frequency, microwave, or other portions of the electromagnetic spectrum, to test signals to the component under test while its execution is monitored and controlled within the compartmentalized testing environment. The system and method is particularly effective for searching for and identifying vulnerabilities to combined Cyber/Electronic Warfare attacks.

16 Claims, 5 Drawing Sheets

COMBINED ANALYTICAL TOOLS FOR ELECTRONIC WARFARE AND CYBERSECURITY TESTING IN EMBEDDED SYSTEMS

GOVERNMENT LICENSE RIGHTS

This invention was made with government support under Contract #FA9453-17-P-0455 awarded by the Air Force Research Laboratory. In accordance with 35 U.S.C. 202(c)(6) the government has certain rights in the invention.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Military communications are commonly targeted by an adversary to disrupt operations and make mission success more difficult to achieve. This effect is commonly achieved for Radio Frequency (RF) communications using Electronic Warfare (EW) techniques such as jamming. Digital communications may also be targeted through cyberattacks (Cyber). Typically, these Cyber and EW attacks are analyzed and mitigated separately.

A new class of combined Cyber/EW attacks targeting software defined communications is an emerging threat. These combined attacks target embedded computing systems executing communications functions, exciting exploitable vulnerabilities in the software. Such exploitable vulnerabilities can lead to denial of the warfighter's communication or exploitation of the communications network by an adversary. The analysis and mitigation of Cyber/EW threats pose different problems than individual Cyber or EW threats.

Commonly, testing environments created to identify, classify, and deter Cyber attacks are purpose built for that function. A synthetic cyber-risk model may be built to detect the vulnerability of a system to Cyber attacks. This detection is achieved through a process of determining vulnerabilities in a system under test during the response to a set of Cyber attacks. Simulation of the network is a primary requirement of these types of systems rather than capturing and analyzing frequencies within which a signal is transmitted. Systems created and optimized to test for Cyber-attacks are not created to test for or detect EW type attacks.

Testing for EW type attacks may be performed through a process of characterizing the RF signal envelope within which a system performs. This type of testing system is configured to detect diverse RF signals through a process of electromagnetic signature analysis of the RF frequencies in which the system under test is designed to operate. Instead of building and operating within a particular network simulation, the system captures incoming RF signals and performs a detailed analysis of the incoming signals so as to permit the system to localize and compartment any such attacks.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "Software Defined Communication" systems refer to communications systems in which traditional hardware and firmware elements are replaced with software implementations of these hardware and firmware components.

Reference throughout this document to a Software Defined Radio (SDR) refers to a radio frequency communication system where components that have been traditionally implemented in hardware (e.g. mixers, filters, amplifiers, modulators/demodulators, detectors, etc.) are instead implemented by means of software on a dedicated standalone, networked, or embedded system. In a non-limiting example, a Software Defined Radio is an exemplary implementation of a Software Defined Communication system.

Reference throughout this document to "Electronic Warfare" refers to attacks on Radio Frequency (RF) systems and communications systems.

Reference throughout this document to "Cyber" refers to cyberattacks on software systems.

Reference throughout this document to "Cyber/EW attacks" refers to combined attacks that attempt to exploit vulnerabilities in RF and communications systems and the software running the RF and communications systems.

Reference throughout this document to a "Vulnerability Search Tool" refers to a technique involving random or guided searches for combinations of data that can be sent to applications/protocols to create effects the designer of such applications/protocols did not plan for that would be exploitable by an attacker. In a non-limiting example, a Fuzzer, as herein disclosed, is an exemplary implementation of a Vulnerability Search Tool.

Reference throughout this document to a "Simulation Manager" refers to a system component of the testing system that coordinates components to implement and conduct the search for vulnerabilities in components under test.

Reference throughout this document to a "Parameterized Signal" refers to a signal generated from parameters including data to be carried, signal characteristics such as phase and frequency, and other effects.

Reference throughout this document to a "Malicious Signal Generator" refers to a module that uses search guidance and information from the simulation manager and other sources to generate a malicious parameterized signal intended to cause a failure in the component and/or system under test.

Reference throughout this document to the "Controlled Execution Environment" refers to a created computing environment designed to isolate, control, and monitor the component and/or system under test.

Reference throughout this document to the "Component Monitor" refers to a module that collects information on the execution of target component(s) and internal signal(s) to provide real-time feedback to the Simulation Manager to control a test regimen and a Vulnerability Search Tool to target the next stage of the search for malicious signals.

Reference throughout this document to "vulnerabilities" refers to any undesired result that occurs when a system under test is exposed to signals, operations, and data that are presented to exercise the options and features of the system under test.

The CyRF system herein described allows software code to be run within a software simulation environment, providing representative signals, whether Radio Frequency, microwave, or other portions of the electromagnetic spectrum, to test signals to the component under test while its execution is monitored and controlled within the compartmentalized testing environment. The CyRF system is particularly effective for searching for and identifying vulnerabilities to combined Cyber/Electronic Warfare attacks.

The CyRF system herein described also allows testing of one or more real HW/SW systems, such as, in a non-limiting example, an operational SDR that can be configured to provide a set of commands and/or operations suitable to exercise and test a component system for a particular range of operation. Increasing the testing effectiveness would be dependent on the range and scope of computation and signal data that is output from the real HW/SW operational system that is providing the input to the component system under test. The real HW/SW system may be configured as a complete black box or could be compliant with an Interface Control Document (ICD) providing a partial/complete set of data.

Software Defined Communications, commonly used in devices such as an SDR, is replacing traditional hardware and firmware elements with software. This software is becoming increasingly complex to provide increased performance, flexibility, and capability in these systems. This low-level communication software resides in Layer 1, the physical layer, and Layer 2, the Data Link layer, of the OSI 7-Layer network communication model. This low-level communication software is normally tested for performance, regulatory compliance, and interoperability prior to releasing the software to customers. Software performing these communications functions and residing at these low-level, embedded layers of the OSI 7-layer model is not normally designed for security, nor is software at this level commonly tested for access or data security. New combined Cyber/EW threats can target communication software designed for and installed in Layer 1 and Layer 2. Where traditional EW may use jamming attacks to interfere with the communications link, a Cyber/EW attack transmits a specially designed signal that may exploit a vulnerability in the communications processing. Separate cybersecurity or communications testing cannot adequately detect system vulnerabilities to a combined Cyber/EW threat. Cyber/EW testing simultaneous consideration of communications and computational elements during testing of communications system and communications system software.

Addressing the challenging problem posed by a combined Cyber/EW threat, design tools must support integrated analysis of signals and computation. In an embodiment, a solution to the challenge of creating a system that can detect and provide solutions for communication systems facing combined Cyber/EW threats is to combine the features of both signal and computational testing into an integrated solution. A solution is to create an analysis and testing tool which may automatically identify Cyber/EW vulnerabilities in software defined communications systems including Software Defined Radios (SDR). The system solution, which may in a non-limiting example be termed the CyRF system, may produce information to replicate vulnerabilities for analysis and signals which can exploit the vulnerabilities of communication systems being tested by the CyRF system. The CyRF system uses instrumentation of both simulated communication signals and executing SDR code to guide the search for combined Cyber/EW vulnerabilities. The CyRF system is fully scalable, enabling complex receiver designs and malicious signal generators to be efficiently evaluated.

In an embodiment, the CyRF system has been developed to discover and disclose vulnerabilities in communication systems, as well as providing vulnerability analysis of systems/components that may have physical features such as motion control systems, power control systems, and other systems with physical and software aspects. In a non-limiting example, a software component providing a vulnerability analysis for a power generation system would require placing power system elements within a compartmented and controlled system test environment where the signals and data required to exercise the devices/components under test would be specific to the power generation system but could use the same architecture and testing techniques in the compartmented testing environment that are used for communications systems testing. Additionally, in a non-limiting example a motion control system could be configured and tested to provide vulnerability analysis of systems and components critical to the motion control system before connecting the motion control system to a real-world environment. These systems, as well as other systems having physical and software aspects may be exercised within the combined, compartmented test environment of the CyRF system. The CyRF system may utilize RF, light, sound, or other communications methods to test devices/components for vulnerabilities.

The CyRF system performs an integrated analysis to identify and perform tests utilizing discovered signals and data to locate and test for vulnerabilities. In a non-limiting example, the CyRF system may be configured to locate malicious signals that may or may not contain valid data. In some cases, a malicious signal may be designed to cause an effect that occurs regardless of the data carried by the signal. Traditional testing systems currently available typically cover normal signals with malicious data and normal signals with invalid data. The CyRF system performs these types of tests as well as additional test configurations. In an alternative non-limiting example, Cyber/EW attacks may change frequently, alternating between normal signals with valid data, malicious signals with valid data, malicious signals with malicious data, normal signals with invalid data and normal signals with malicious data. The CyRF system is broadly configured to test for each of these attacks.

In an embodiment, the CyRF system provides security testing capabilities for low-level Physical and Data Link Layer signal processing functions, communications protocols, and processes needed to establish and maintain communications. Security testing of these communications functions requires access to RF signals, complex processing of the signals, analysis of the data that may be contained within a particular signal, and communications protocols/processes. The CyRF system accomplishes this by providing an integrated communications simulation capability within a controlled, security testing environment. This integrated test environment may both generate test signals and determine how the signals affect the computational and communications performance of the communications system. Performing these tests in the simulated environment built and maintained by the CyRF system permits the identification of exploitable vulnerabilities before an operational system is released to customers in the field.

The CyRF system's use of integrated computational and communications data for security testing of combined cyber-attack and EW (signals) threats to software defined communications systems is believed to be a unique capability. The integrated system herein described provides additional capabilities for detecting Cyber/EW vulnerabilities through addressing security issues at Layer 1 and Layer 2, performing security testing on the communication signals that carry the data, i.e. data communications, and generating properly selected inputs to provide for a complete testing regimen to exercise the communications software, disclose vulnerabilities, and assist in closing vulnerabilities and building communications software that is more robust and less susceptible to attack.

In an embodiment, the CyRF system integrated RF and Security Testing Environment may include an automated method to generate signal and data inputs which maximize code coverage of communications functions during testing. This type of analysis is difficult for RF communications systems because input signals which properly exercise the functions must be determined. The CyRF system uses software instrumentation to experimentally verify code coverage and adapt input signals and data to search deeper within software code as implemented. This depth of search is especially important because communications systems are normally designed for steady-state performance. Finding signals and data that drive the system out of steady-state and exercise less used communications functions is essential to security testing for both Cyber and EW attack considerations.

In an embodiment, the CyRF system provides an automated search function that may perform iterative security testing of executing code automatically identifying signals and data that can lead to failure or an exploit of the communications system. Where traditional protocol or process vulnerabilities can be found through simple input checks of specific functions, combined Cyber/EW vulnerabilities may occur through complex computational and signal interactions in communications processing. The search performed by the CyRF system during combined testing uses a library of parametric malicious signals which can carry data targeting vulnerable system components. This combination of signal and data testing enables interactions between system components to be exercised and vulnerabilities identified. Once identified, the CyRF system reports the discovered vulnerabilities to one or more users to permit the vulnerabilities to be addressed and mitigated.

In an embodiment, the CyRF system does not search for the input at the communication processing component that exploits the vulnerability, the CyRF system searches for the transmittable signal. To exploit a vulnerability remotely, a transmittable signal must be determined that after being partially processed by the receiver results in the needed input at the component. Finding this transmittable signal or series of signals can be a difficult problem with cannot be solved using traditional security analysis. The CyRF system uses a unique combination of integrated execution environment, dynamic analysis, and automated vulnerability detection to drive the search for the transmittable signal that exploits the communication system. This integrated capability to discover and utilize actionable signals differentiates the CyRF system as a Cyber/EW vulnerability testing tool from existing communications testing solutions.

In an embodiment, the CyRF system operates through integrating an automated security analysis tool, defined as a vulnerability search test environment that finds code vulnerabilities through a guided parameter search maximizing code coverage, with a communication simulation tool. This CyRF system integration allows a radio receiver code to be run within a communications simulation environment, providing representative RF signals to the receiver while its execution is monitored and controlled within the CyRF system simulation environment. In a non-limiting example, a vulnerability search tool for performing the vulnerability search during testing may be implemented as a mutation Fuzzer technique. However, the recitation of a Fuzzer should not be considered limiting as alternative vulnerability search tools and/or techniques may be implemented within the testing environment to achieve the search capability. The mutation fuzzer in CyRF uses both signal metrics and code instrumentation to guide its automated search for exploitable Cyber/EW openings. The CyRF system architecture enables rapid transition from simulation to SDR for over-the-air confirmation of vulnerabilities. This transition provides not only for identification of communications vulnerabilities within the simulation environment, but also provides for real world verification testing through the SDR.

In an embodiment, the CyRF system may use combined computation and signal feedback to perform an analysis to discover signals and data within such signals that exercise vulnerabilities in software associated with devices and components under test within a compartmented testing environment. The system uses combined information to make search decisions and utilizes an architecture and methods to enable the search to drive the automated identification of faults and vulnerabilities in a system under test. In a non-limiting example, the CyRF system may integrate communications simulation and controlled execution environment to support security analysis of combined signal and data threats to communication system software. In a non-limiting example, the CyRF system generates adaptive parametric signals through the use of combined feedback information from computation instrumentation and internal signals within a communication system sufficient to exercise components under test. In a non-limiting example, the CyRF system may automate one or more vulnerability searches using parametric signal generation to identify signals that exploit communications function vulnerabilities in software associated with devices and/or components. In a non-limiting example, the CyRF system performs dynamic analysis of software using the combination of software instrumentation and signal properties to improve code coverage to enable broader and more comprehensive testing of software associated with devices and/or components under test. In a non-limiting example, the CyRF system searches for and locates one or more transmittable signals which excite vulnerabilities in communications components and the software associated with communications components after the transmittable signal has been partially processed by a target receiver, where the receiver is located within a device and/or component under test.

Figure 1:
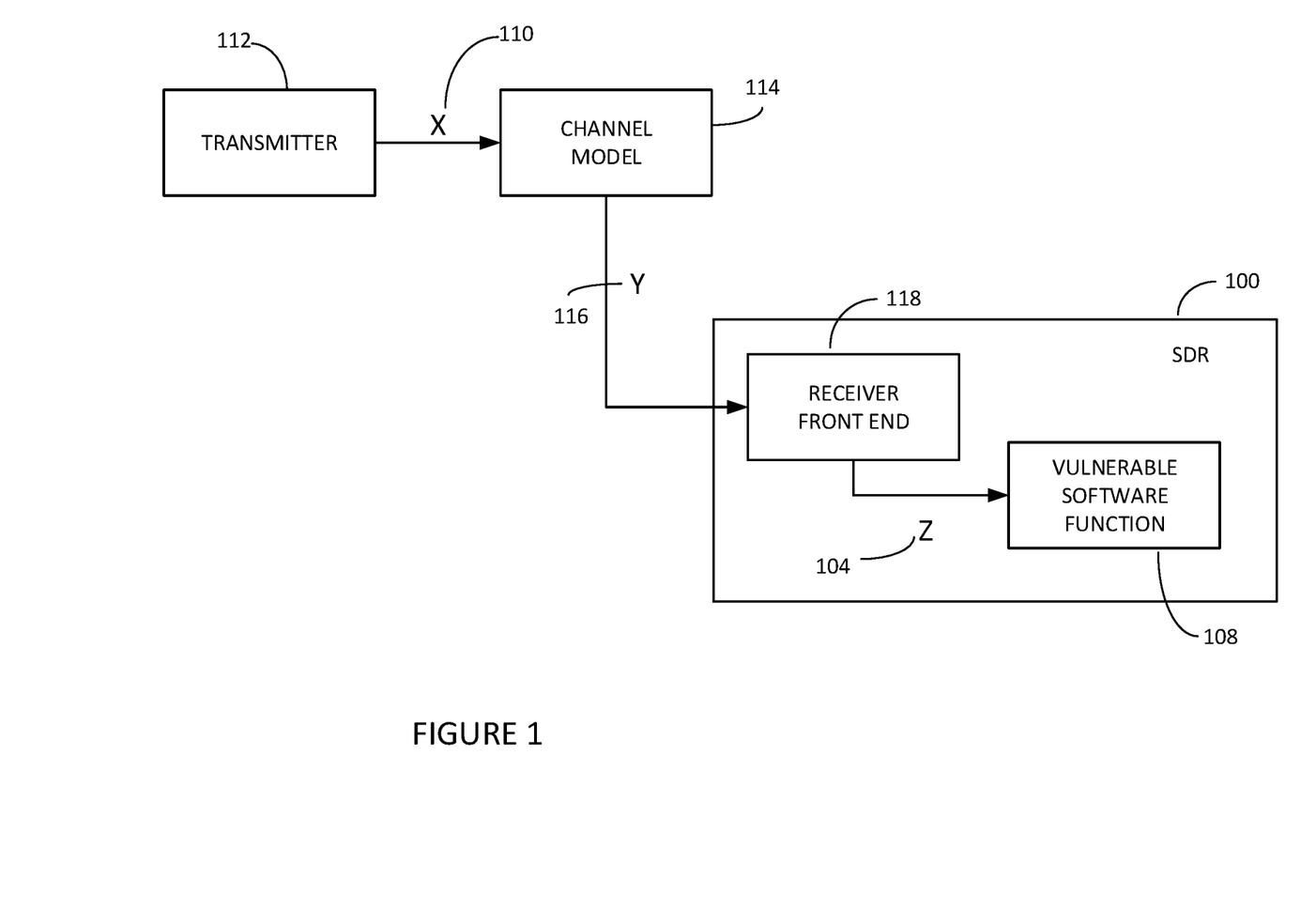
FIG. 1 is a view of a process path for testing to identify Software Defined Radio vulnerabilities consistent with certain embodiments of the present invention.

Turning now to FIG. 1, this figure presents a view of a process path for testing to identify Software Defined Radio vulnerabilities consistent with certain embodiments of the present invention. In an exemplary embodiment, in any SDR 100 testing activity the physical layer (PHY) testing considers the processing of RF signals themselves, not just the data the signals carry, the full path of the signal from the transmitter to a vulnerable software function must be considered for analysis in any testing scenario. If through analysis a value or series of values, designated as Z 104, which produces a cyber effect on the Vulnerable Software Function 108 is identified, a value or series of values X 110 must be created for the transmitter 112 to produce the cyber effect that is of interest for any particular test. Design of the values for X 110 must consider the over-the-air effect on a signal traversing a Channel Model 114 from X 110 to Y 116. Additionally, the effect of any SDR 100 processing of the signal prior to arrival at the Vulnerable Software Function 108 must be considered as well. This additional processing may be represented by the signal traveling from Y 116, traversing the receiver front end 118 and arriving at Z 104 prior to receipt at the Vulnerable Software Function 108.

In an embodiment, a major point for consideration in practicing any test regimen is that although the Receiver Front End 118 components may be well understood and given Y 116 the output at Z 104 is easily calculable, the inverse function for calculating the values for Y 116 given the values for Z 104 is not normally easily calculable. Ignoring the effect of the channel model 114, the value of the signals at X 110 is equal to the value of the signals at Y 116. Even in this simplified testing regimen, even if a value of the signal at Z 104 is known which can exploit the Vulnerable Software Function 108, determining a transmittable signal value at X 116 that can result in the value of the signal at Z 104 that results in the exploit is non-trivial.

In this embodiment, the CyRF system may perform security testing taking into account and considering all components in the full signal path. The determination of the value of X 110 is the primary challenge for Cyber and EW attacks, and is the key difficulty for those types of attacks on any software function. The CyRF system is designed to search for and determine those values of X 110 that exploits the vulnerabilities of any software function, and not the value of Z 104. Upon determination of the value of a candidate X 110 that will exploit the vulnerable software function, the signal value of X 110 can be varied and modified to find a value of X' (not shown) which will account for transmission effects as well as the value that will exploit the vulnerable software function. In a non-limiting example, established RF techniques may be used to drive the search for the value of X'.

Figure 2:
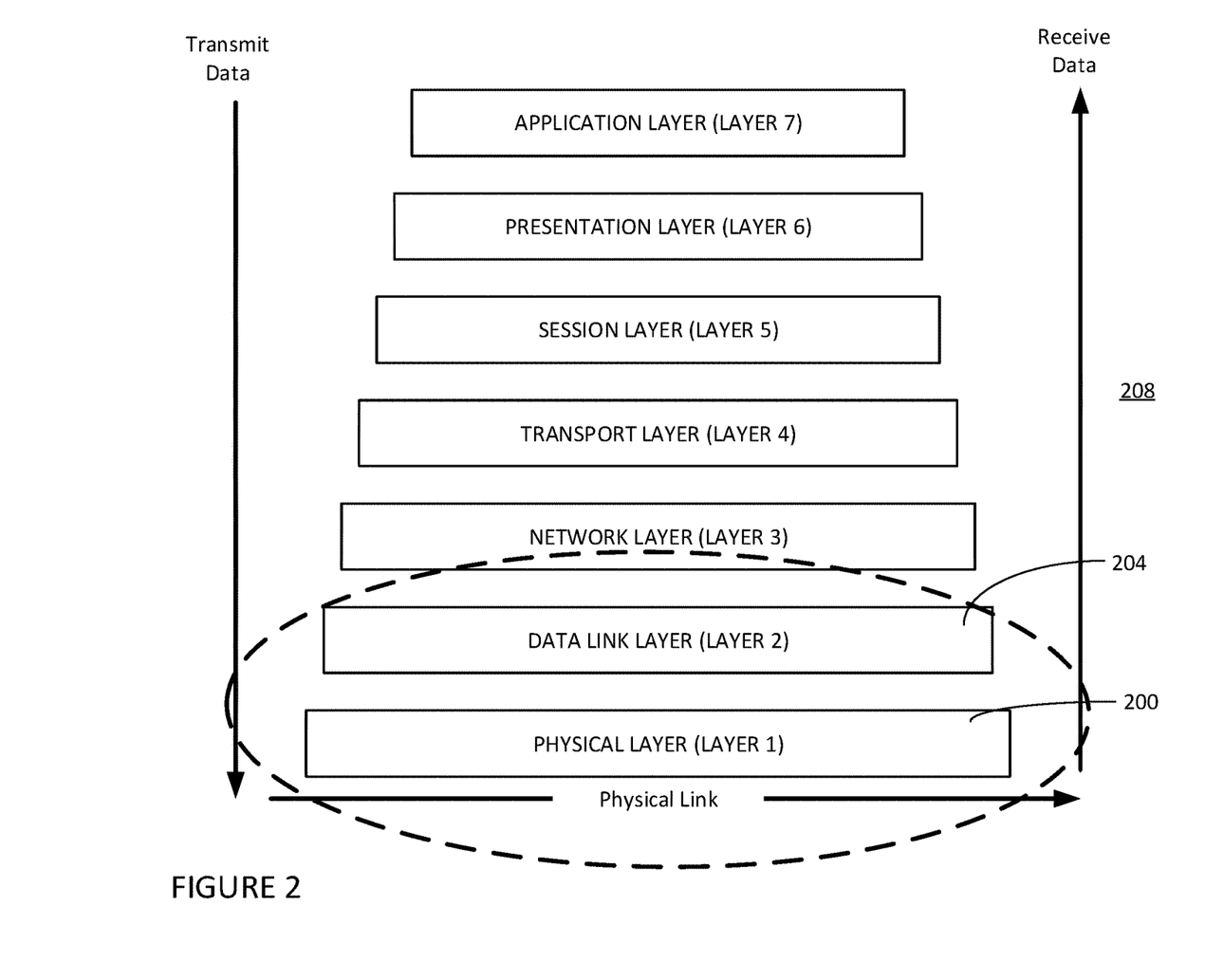
FIG. 2 is a view of the portion of the Open System Interconnection (OSI) 7-Layer Network connection model to be tested for security consistent with certain embodiments of the present invention.

Turning now to FIG. 2, this figure presents a view of the portion of the OSI 7-Layer Network connection model to be tested for security consistent with certain embodiments of the present invention. In an exemplary embodiment, as previously presented the system presents a testing environment that has a primary focus on Cyber/EW attacks that occur at the Physical (Layer 1) 200 and the Data Link Layer (Layer 2) 204 of the OSI 7-Layer communication model 208. The low-level communication software resident in the Physical 200 and Data 204 layers is normally tested for performance, regulatory compliance, and interoperability. Standard test models are not designed for and generally do not account for security considerations or test for security vulnerabilities. An issue with current, newly available combined Cyber/EW threats is that such threats can target communications software that is installed and operational in the Physical 200 and Data 204 layers.

In a non-limiting example, where traditional EW attacks may use jamming attacks to interfere with the communications link utilizing the OSI 7-layer model 208 between a source and a destination, a Cyber/EW attack may discover and transmit a specially designed signal that will exploit a vulnerability in the communications processing between the source and destination.

Figure 3:
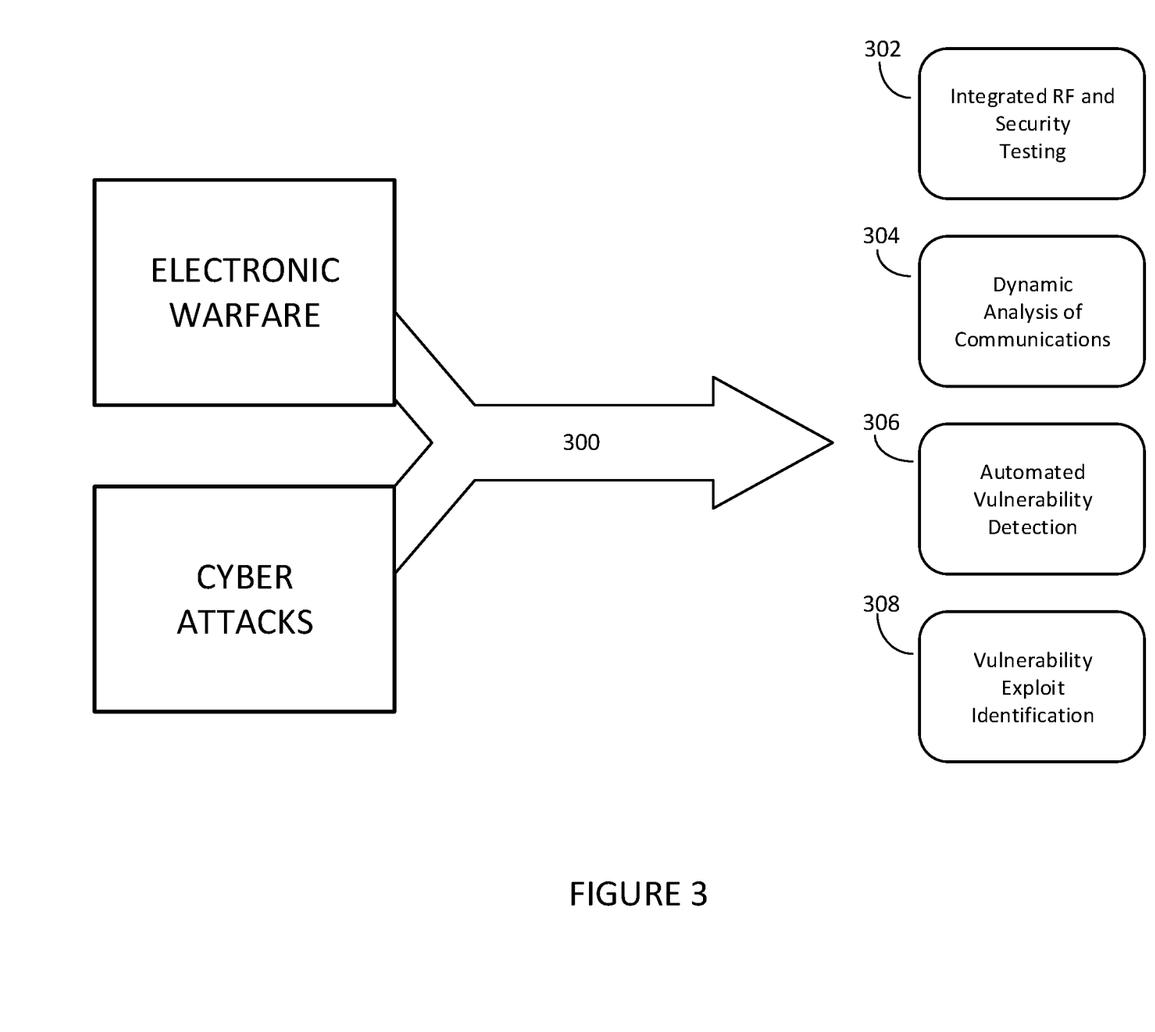
FIG. 3 is a view of the integration of testing for EW and Cyber Attacks consistent with certain embodiments of the present invention.

Turning now to FIG. 3, this figure presents a view of the integration of testing for EW and Cyber Attacks consistent with certain embodiments of the present invention. In an exemplary embodiment, separate cybersecurity or communications testing cannot adequately detect system vulnerabilities to a combined Cyber/EW 300 threat. Cyber/EW 300 testing is designed to account for simultaneous consideration of communications and computational elements during a testing cycle for vulnerable software functions.

The CyRF system presents an integrated approach to designing and performing security testing for vulnerable software functions at the Physical and Data Link Layers of the 7-layer OSI model. The CyRF system also provides additional capabilities to address security issues during test, analyzing and providing modification for signals which carry the data, and provides for the generation of inputs to properly exercise vulnerable software functions. This generation of inputs for properly exercise software functionality is an improvement over software computational analysis, such as, in a non-limiting example, dynamic analysis of executing software code.

In an embodiment, the CyRF system provides for integrated RF and Security testing 302. To accomplish this function, the CyRF system provides security testing capabilities for low-level Physical and Data Link Layer signal processing functions, communications protocols, and processes needed to establish and maintain communications. In a non-limiting example, the CyRF system accomplishes this capability by providing an integrated communications simulation capability within a controlled, security testing environment. This integrated test environment may both generate test signals and determine how the signals affect the computational and communications performance of the communications system.

In an embodiment, the CyRF system provides for the dynamic analysis of communications in the physical and Data Link Layers 304. This analysis is difficult for RF communications systems due to the fact that input signals which properly exercise the software functions and features must be determined. In an exemplary embodiment, the CyRF system provides an integrated RF and Security Testing Environment that includes an automated method to generate signal and data inputs which maximize code coverage of communications functions during an active testing regimen. The CyRF system may use software instrumentation to experimentally verify code coverage and adapt input signals and data contained within such input signals to search deeper within the code under test. This depth of search is especially important because communications systems are normally designed for steady-state performance and many vulnerabilities occur at signal transition points, data transfer start and stop points, or at function transition points. Finding signals and data that drive the system out of steady-state and exercise less used communications functions is essential to security testing.

In an embodiment, the CyRF system provides for automated vulnerability detection 306. The CyRF system provides an automated search function that may perform iterative security testing of executing code automatically identifying signals and data that may lead to failure or an adversarial exploit of the communications systems. This automated search function uses a library of parametric malicious signals which can carry data targeting vulnerable system components. This combination of signal and data testing enables interactions between system components to be exercised and vulnerabilities identified.

In an embodiment, the CyRF system also provides for vulnerability exploit identification once the automated vulnerability detection provides a positive result 308. Many techniques may be used to find an input signal that can exploit a vulnerability in a software function. While knowing the internal signal within the receiver related to a specific function vulnerability is useful, knowing that signal does not consider the full signal path through which a malicious signal would be processed to create the desired internal signal. Finding a transmittable signal or series of signals can be a difficult problem which cannot be solved using traditional security analysis.

The CyRF system does not search for the input at the communications processing component that exploits the vulnerability, instead the CyRF system searches for the transmittable signal. The CyRF system uses a unique combination of integrated execution environment, dynamic analysis, and automated vulnerability detection to drive the search for the transmittable signal that exploits the communication system and exposes vulnerabilities. The integrated capability to find actionable signals differentiates the CyRF system as a Cyber/EW vulnerability tool.

Figure 4:
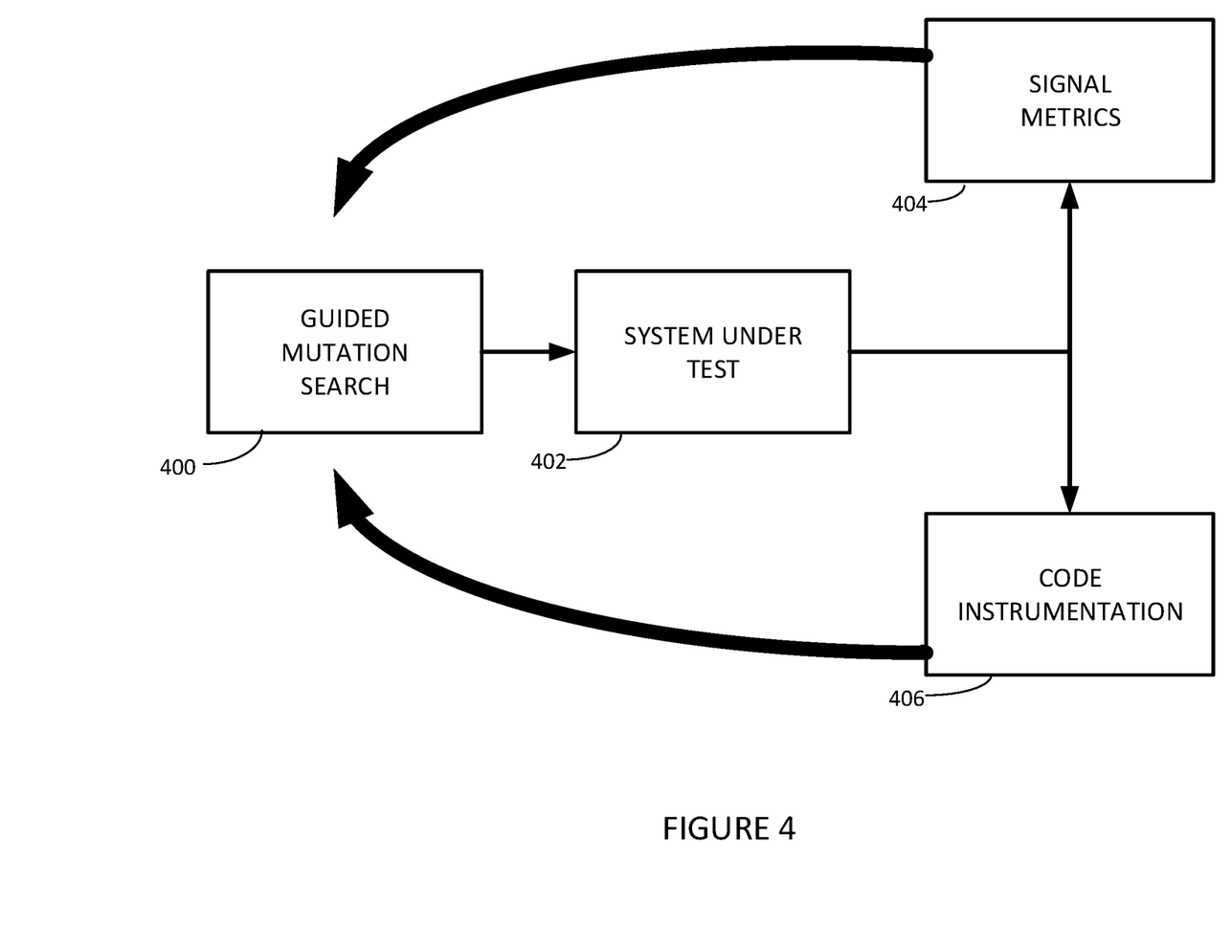
FIG. 4 is a view of the controlled execution environment consistent with certain embodiments of the present invention.

Turning now to FIG. 4, this figure presents a view of the controlled execution environment consistent with certain embodiments of the present invention. In an exemplary embodiment, the CyRF system performs a guided mutation search 400 to discover the signals and data within such signals that can properly exercise the software code installed within a system under test 402. The CyRF system operates by integrating an automated security analysis tool, a vulnerability search element, such as, in a non-limiting example a Fuzzer, that may be installed within the testing environment to discover and report code vulnerabilities through a guided parameter search maximizing code coverage, with a communications simulation tool. The CyRF system integration allows a radio receiver code to be run within a communications simulation, providing representative RF signals to the receiver while the code execution within the system under test 402 is monitored and controlled within the CyRF system test environment. The mutation fuzzer in the CyRF system may use both signal metrics 404 and code instrumentation to guide its automated search for Cyber/EW vulnerabilities. The CyRF system architecture enables rapid transition from simulation to SDR for an over-the-air confirmation of vulnerabilities.

Figure 5:
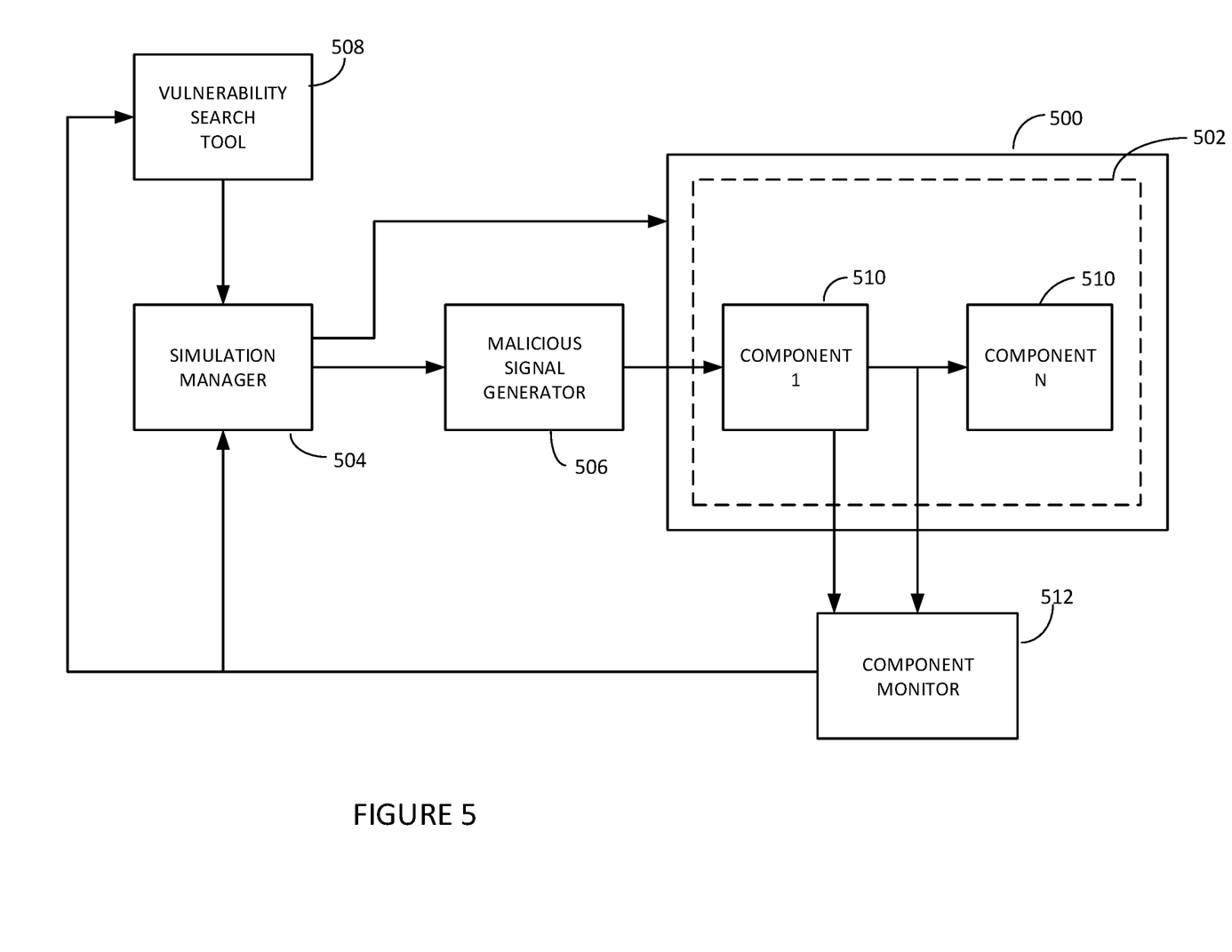
FIG. 5 is a flow diagram for the system communications when testing for vulnerabilities when components are under test in the controlled environment consistent with certain embodiments of the present invention.

Turning now to FIG. 5, this figure presents a flow diagram for the system communications when testing for vulnerabilities when components are under test in the controlled environment consistent with certain embodiments of the present invention. In this embodiment, the CyRF system instantiates a controlled execution environment 500 within which the simulation or system under test is connected and encapsulated 502 to permit the testing of system and code vulnerabilities. Additionally, the system under test may be connected to a customized or pre-configured real-world communications system to again test for system and code vulnerabilities utilizing real and not simulated functionality, exercising the system under test with real world signals, data, and operational conditions before releasing the system and code under test to an active environment. The CyRF system controlled execution environment 500 is a computing environment that is designed to isolate, control, and monitor the system and/or system component under test, whether the system under test is exercised utilizing simulated inputs or exercised through the connection to a real-world source of signals, data and operational conditions. During a testing operation, the CyRF system simulation manager 504 initializes one or more components to implement the search for a target signal and coordinates these components during the testing program. The simulation manager 504 transmits test parameters to a malicious signal generator 506 and establishes control over the controlled execution environment to perform the search for code vulnerabilities.

In an embodiment, the CyRF system has a vulnerability search tool component 508, implemented, in a non-limiting example, as a fuzzer component, that manages the search for vulnerabilities. The fuzzer component 508 provides search guidance and signal variances to the simulation manager 504 to permit the simulation manager 504 to transmit control guidance to the controlled execution environment 500 and updated parameters to the malicious signal generator 506 as the guidance from the fuzzer component 508 updates and changes. During a test regimen the malicious signal generator 506 may use search guidance and information from the simulation manager 504 to generate a malicious parameterized signal intended to cause a failure in the system under test. In a non-limiting example, the malicious parameterized signal may be received by one or more target components 510 installed within the system under test within the controlled execution environment 500. While a test regimen is operating, the component monitor 512 may collect information on the execution of target component(s) 510 and internal signal(s) to provide real-time feedback to the simulation manager 504 to continue control of the test regimen and the fuzzer component 508 to target the next stage of the search for signals that may expose and/or exploit vulnerabilities in the target component(s) 510 in the system under test.

While certain illustrative embodiments have been described, it is evident that many alternatives, modifications, permutations and variations will become apparent to those skilled in the art in light of the foregoing description.

We claim:

1. A system to test for hardware component vulnerabilities comprising:
   instantiating a controlled execution testing environment;
   installing at least one of said hardware component system within said controlled execution testing environment;
   generating a malicious signal to create a previously unexperienced exploit in at least one software function of said hardware component system;
   transmitting said malicious signal as input to the at least one of said hardware component system to test performance of the at least one of said hardware component system;
   monitoring performance of said at least one of said hardware component system during said test;
   collecting performance data from said test and transmitting the performance data as feedback to a simulation manager;
   analyzing the performance data at the simulation manager of said at least one of said hardware component system to discover performance data that is inconsistent with expected performance of the at least one of said hardware component system, where analyzing the performance data further comprises combined computation and signal feedback analysis to identify one or more vulnerabilities in said at least one software function;
   calculating from said combined computation and signal feedback analysis an input signal that causes said one or more identified vulnerabilities and generating a modified input signal as a malicious input signal;
   providing an indication to one or more users of said malicious input signal, said exploit, and said modified input signal that identified and generated said one or more identified vulnerabilities.

2. The system of claim 1, further comprising a vulnerability search tool component to modify the malicious signal under pre-set conditions and providing said modified malicious signal to the simulation manager.

3. The system of claim 1, where combined computation and signal feedback analysis reviews the signal composition and data embedded within said malicious signal provided to said hardware component system under test.

4. The system of claim 1, where generating said malicious signal further comprises generating multiple malicious signals in an iterative process utilizing said performance data as feedback to exercise a plurality of the functions of the at least one of said hardware component system.

5. A method of testing for component vulnerabilities, comprising:
   instantiating a controlled execution testing environment;
   installing at least one component system within said controlled execution testing environment;
   providing adaptive signal control parameters from a simulation manager to a malicious signal generation module;
   generating a malicious signal utilizing said adaptive signal control parameters to create a previously unexperienced exploit in at least one software function of said component system;
   transmitting the generated malicious signal as an input to test said at least one component system;
   collecting signal data and execution data from said test and transmitting the signal data and execution data as feedback to a simulation manager;
   analyzing the data provided as feedback at the simulation manager of said at least one component system to discover performance that is inconsistent with expected performance of the at least one component system;
   calculating from said combined computation and signal feedback analysis an input signal that causes said one or more identified vulnerabilities and generating a modified input signal as a malicious input signal;
   providing to one or more users an indication of said malicious input signal and said modified input signal that generated the said one or more identified vulnerabilities.

6. The method of claim 5, further comprising generating a malicious input signal at the malicious signal generation module utilizing signal data and execution data received from said at least one component system under test.

7. The method of claim 6, where said generated malicious input signal comprises signal composition and data embedded within said signal composition.

8. The method of claim 7, where said generated malicious input signal is generated by modifying the signal composition, modifying the data embedded within said signal composition, modifying both the signal composition and the data embedded within said signal composition, and/or modifying neither the signal composition and the data embedded within said signal composition.

9. The method of claim 5, where a vulnerability search tool component provides instructions to the simulation manager to modify the malicious input signal by changing the adaptive signal control parameters under pre-set conditions.

10. A method of testing for component vulnerabilities, comprising:
    instantiating a controlled execution testing environment;
    installing at least one component system within said controlled execution testing environment;
    performing a search for a malicious signal to be applied to the at least one component system comprising the steps of:
       receiving a set of parameters from a vulnerability search tool component at a simulation manager;
       the simulation manager operative to control the controlled execution testing environment and transmit said set of parameters to a malicious signal generator module;
       generating a malicious signal utilizing said adaptive signal control parameters to create a previously unexperienced exploit in at least one software function of said component system;
       transmitting the generated malicious signal to test said at least one component system;
       collecting signal data and execution data from said test and transmitting the signal data and execution data as feedback to said simulation manager and said vulnerability search tool;
       analyzing the signal data and execution data at the simulation manager of said at least one component system to discover performance data that is inconsistent with expected performance of the at least one component system;
       calculating from said performance data and execution data an input signal that causes unexpected performance and generating a modified input signal as a malicious input signal;

storing in a digital storage device all signal data, execution data, and analysis data generated from said signal data and execution data;

if search regimen is not completed return to receiving step;

retrieving analysis data from said digital electronic storage device and providing an indication of identified vulnerabilities collected in said analysis data and the generated malicious input signal and modified input signal that identified any vulnerabilities to one or more users.

11. The method of claim 10, further comprising providing signal data and execution data to said simulation manager.

12. The method of claim 11, where adaptive signal control parameters comprise signal data, execution data, and parameters from said vulnerability search tool combined by said simulation manager.

13. The method of claim 10, further comprising providing real-world signals, data, and operations from a real-world system connected to said component system.

14. A method of testing for component vulnerabilities, comprising:

instantiating a controlled execution testing environment;

installing at least one component system within said controlled execution testing environment;

identifying a signal composition that creates a previously unexperienced exploit in the at least one component system;

receiving said signal composition at a vulnerability search tool component and a simulation manager component;

modifying said signal composition at said simulation manager utilizing parameters provided from said vulnerability search tool component;

calculating an input signal that causes a vulnerability as a result of said previously unexperienced exploit and generating said calculated input signal as a modified malicious input signal;

transmitting the modified malicious input signal composition to a malicious signal generator for creation of said modified malicious signal;

transmitting the modified malicious signal to the controlled execution testing environment and applying the modified malicious signal to the at least one component system under test;

collecting execution data and signal data from the at least one component system under test at a component monitor module to identify vulnerabilities in said component system under test;

providing an indication of said identified vulnerabilities and said modified malicious signal that generated the identified vulnerabilities to one or more users.

15. The method of claim 14, where the modified malicious signal is generated by modifying the data embedded within said signal composition, modifying both the signal composition and the data embedded within said signal composition, and/or modifying neither the signal composition and the data embedded within said signal composition.

16. The method of claim 14, where the indication of identified vulnerabilities comprises identifying all vulnerabilities in the software installed within the at least one component systems under test regardless of function impacted by said identified vulnerability.

* * * * *